United States Patent [19]

Knight et al.

[11] Patent Number: 5,727,609
[45] Date of Patent: Mar. 17, 1998

[54] TRANSPORT APPARATUS

[75] Inventors: Michael Terence Knight, Rise Park; Steven Dennis Gallagher, Breedon on the Hill, both of United Kingdom

[73] Assignee: Gem Vending Limited, Derby, United Kingdom

[21] Appl. No.: 616,183

[22] Filed: Mar. 15, 1996

[30] Foreign Application Priority Data

Mar. 15, 1995 [GB] United Kingdom .................. 9505190

[51] Int. Cl.$^6$ ........................................ B65B 1/04
[52] U.S. Cl. ...................... 141/129; 141/104; 141/165; 222/129.4
[58] Field of Search ........................... 141/129, 156, 141/157, 159–162, 165, 168, 171, 172, 174, 175, 104; 222/129.4; 414/749; 901/17, 47; 250/231.13

[56] References Cited

U.S. PATENT DOCUMENTS

| | | | |
|---|---|---|---|
| 3,226,833 | 1/1966 | Lemelson | 901/47 |
| 4,009,740 | 3/1977 | Michielli | 141/174 |
| 4,274,801 | 6/1981 | Herb et al. | 414/749 |
| 4,628,974 | 12/1986 | Meyer | 141/168 |
| 4,728,788 | 3/1988 | Myers et al. | 250/231.13 |
| 4,965,445 | 10/1990 | Ikeuchi et al. | 250/231.13 |
| 5,000,345 | 3/1991 | Brogna et al. | |
| 5,027,698 | 7/1991 | Chirnomas | |
| 5,276,323 | 1/1994 | Nakaho | 250/231.13 |
| 5,394,911 | 3/1995 | Zizola | 141/174 |

FOREIGN PATENT DOCUMENTS

| | | |
|---|---|---|
| 426591 | 12/1991 | European Pat. Off. |
| 513845 | 11/1992 | European Pat. Off. |

Primary Examiner—Henry J. Recla
Assistant Examiner—Steven O. Douglas
Attorney, Agent, or Firm—Watts, Hoffmann, Fisher & Heinke Co., L.P.A.

[57] ABSTRACT

Transport apparatus for use in a drinks vending machine. The apparatus comprises a holder for receiving and holding a cup, and transport mechanism to move the cup to a dispensing region. The dispensing region comprises a plurality of dispensers, from a selected number of which, ingredients can be dispensed to the cup. Thereafter, the transport mechanism moves the cup to a delivery position to deliver the cup to an operator.

18 Claims, 5 Drawing Sheets

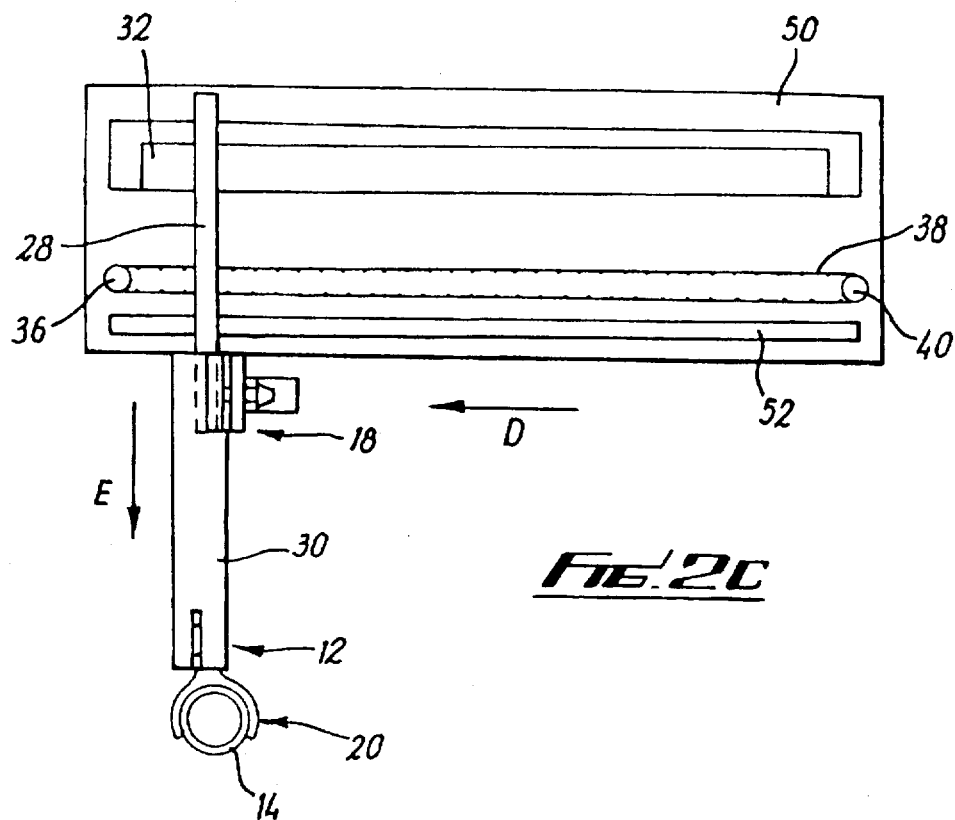
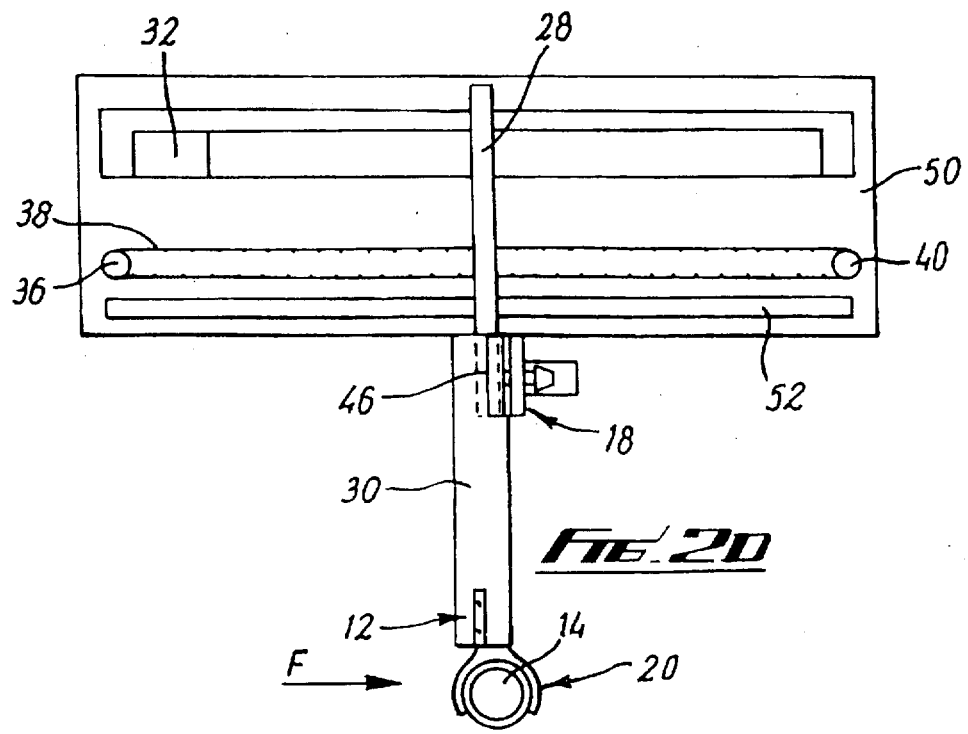

TRANSPORT APPARATUS

FIELD OF THE INVENTION

This invention relates to transport apparatus. In particular, this invention relates to vending machines incorporating transport apparatus.

In known drinks vending machines, it is possible to select from a range of different drinks, and the machine automatically mixes the ingredients for the operator. This is often done by providing a rage of ingredients in the machine all of which are linked to a mixing vessel, and when the operator selects a particular drink, the machine dispenses from the bottles containing the ingredients suitable amounts of the appropriate ingredients via respective pipes to the mixing vessel. When the ingredients have been mixed, they are then transferred to the cup.

A disadvantage of such a system is that there can be problems associated with hygiene, cleaning and the materials. There is also considerable time expended in carrying out the required hygiene practices.

SUMMARY OF THE INVENTION

It is an object of this invention to obviate and/or mitigate this disadvantage.

According to this invention there is provided transport apparatus for use in a drinks vending machine, said apparatus comprising holding means for receiving and holding a cup, and transport means to move said cup to a dispensing region comprising a plurality of dispensers from a selected number of which ingredients can be dispensed to the cup, and thereafter to move said cup to a delivery position to deliver the cup to an operator.

The holding means may comprise carrying means and a holder wherein the carrying means carry said holder. Preferably, the carrying means is elongate, and the holder is provided at one end thereof.

The holder may comprise first and second fingers extending outwardly from said carrying means to receive a cup therebetween. Preferably, the first and second fingers are curved and may define a major portion of a circle.

The transport means may comprise first drive means for moving the holder along a first axis, and second drive means for moving the holder along a second axis. Preferably, the first and second axes are substantially perpendicular to each other.

The first drive means may comprise an endless member, a driven wheel or sprocket, an idler wheel or sprocket, and a first motor to drive the driven wheel or sprocket. The endless member may be in the form of a chain or belt extending around the driven and idler wheels or sprockets. The endless member may be formed of a suitable material, for example, steel or a plastics material.

Preferably, the carrying means is mounted on said endless member. A housing may be provided on which the driven and idler wheels or sprockets are mounted, and in which the motor is housed. Thus, operation of the motor causes movement of the driven wheel or sprocket which, in turn, moves the endless member, and the idler wheel or sprocket. Movement of the endless member causes movement of the carrying means linearly along said first axis. Thus, the holder can be moved by the first drive means linearly between the driven and idler wheels or sprockets.

The second drive means may comprise a second motor mounted on the carrying means and a gear in engagement with the carrying means. The carrying means may comprise a fixed arm fixedly connected to the first drive means, and a moveable arm in engagement with said gear whereby rotation of the gear by said further drive means causes said moveable arm to move relative to said fixed arm. Preferably, movement of said moveable arm by said further drive means is in a direction substantially perpendicular to movement of the carrying means by said first drive means. Preferably, the fixed arm is fixedly mounted on the endless member.

The gear may be provided with teeth and the moveable arm may be provided with corresponding teeth or recesses to define a rack with which the teeth on said gear can mesh. Alternatively, the gear may move the moveable arm by friction engagement therewith.

Preferably, the moveable arm is slidable relative to the fixed arm.

The first and second drive means may each be provided with measuring means to measure the distance moved by the holder. Conveniently, the measuring means comprises a rotatable member defining a plurality of substantially equispaced apertures therein. Said apertures may be in the form of slots.

The measuring means may further include photo-sensitive counting means on one side of the rotatable member and a light source on the other side to direct light towards the counting means via said apertures, whereby upon movement of the holder by either said first or second drive means, the appropriate rotatable member is caused to rotate and the light source to direct light upon the rotatable member. Thus, the counting means will detect light passing through each aperture as the apertures rotate passed the light source. In this way, the distance travelled by the holder can be determined.

Control means may be provided to control the first and second drive means to process information from the measuring means thereby to control movement of the holder. The control means may also control the dispensing of ingredients from the dispensers.

According to another aspect of this invention there is provided a vending machine comprising transport apparatus as described in paragraphs 5 to 16 above, and a plurality of dispensers each being adapted to hold an ingredient whereby when the cup is moved to the dispensing region, a predetermined amount of ingredient from a selected one or more of the dispensers can be delivered to the cup.

The transport apparatus may comprise any or all of the features described in paragraphs 6 to 16 above.

BRIEF DESCRIPTION OF THE DRAWINGS

An embodiment of the invention will now be described by way of example only with reference to the accompanying drawings in which:

FIGS. 2A–2E show transport apparatus in various positions.

SPECIFIC DESCRIPTION

Figure 1:
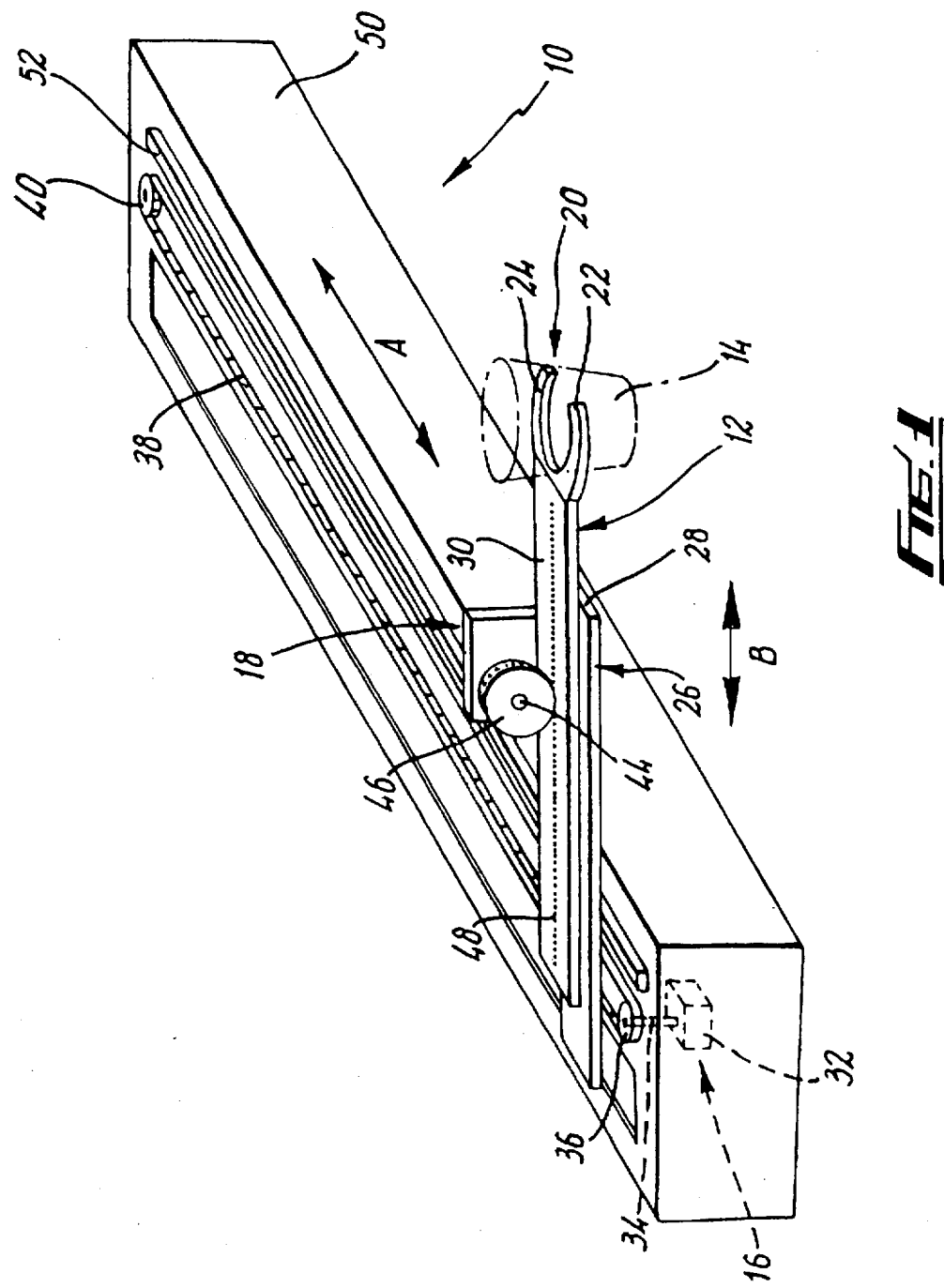
FIG. 1 is a schematic perspective view of transport apparatus.

Referring to FIG. 1, there is shown transport apparatus 10 for use in a drinks vending machine. The apparatus 10 comprises holding means 12 for receiving and holding a cup 14 (shown in dotted lines in FIG. 1), and transport means to move the cup to various positions in the vending machine. Transport means comprises first drive means 16 for moving the holding means in the direction indicated by the double headed arrow A, and second drive means 18 for moving the holding means 12 in the direction indicated by the double headed arrow B.

The holding means 12 comprises a holder 20 to hold the cup 14. The holder 20 is in the form of first and second curved fingers 22, 24, as shown. The cup is received between the fingers 22, 24 as shown by the dotted lines.

The holding means 12 also comprises carrying means 26 in the form of a fixed arm 28 and a moveable arm 30. The fixed arm 28 is fixedly mounted on the first drive means 16, as will be explained below. The moveable arm 30 is slidably mounted on the fixed arm 28 and can move in the direction indicated by the double headed arrow B as will be explained below.

The first drive means 16 comprises a first motor 32 which is connected by a shaft 34 to a driven sprocket 36 an endless member in the form of a chain 38 formed from a plastics material extends from the driven sprocket 36 to an idler sprocket 40.

The fixed arm 28 is fixedly mounted to the chain 38 whereby when the motor 32 drives the driven sprocket 36 the holding means 12 can be moved in the directions indicated by the arrow A.

The second drive means 18 comprises a second motor 42 connected by a shaft 44 to a gear 46. The gear 46 is provided with teeth which mesh with recesses 48 in the moveable arm 30. Thus, the moveable arm 30 and the gear 46 constitute a rack and pinion arrangement whereby rotation of the gear 46 by the second linear motor 42 causes the moveable arm 30, and thereby the holder 20 to move in the directions indicated by the arrow B.

The apparatus further comprises a housing 50 upon which the driven sprocket 36 and the idler sprocket 40 are arranged, and in which the first linear motor 32 is housed. A slide member 52 is provided on the housing 50 upon which the fixed arm 28 can slide.

The apparatus may further comprise measuring means (see FIG. 3) to determine the distance moved, and thereby the position, of the holder 20, as will be explained below.

Figure 2A:
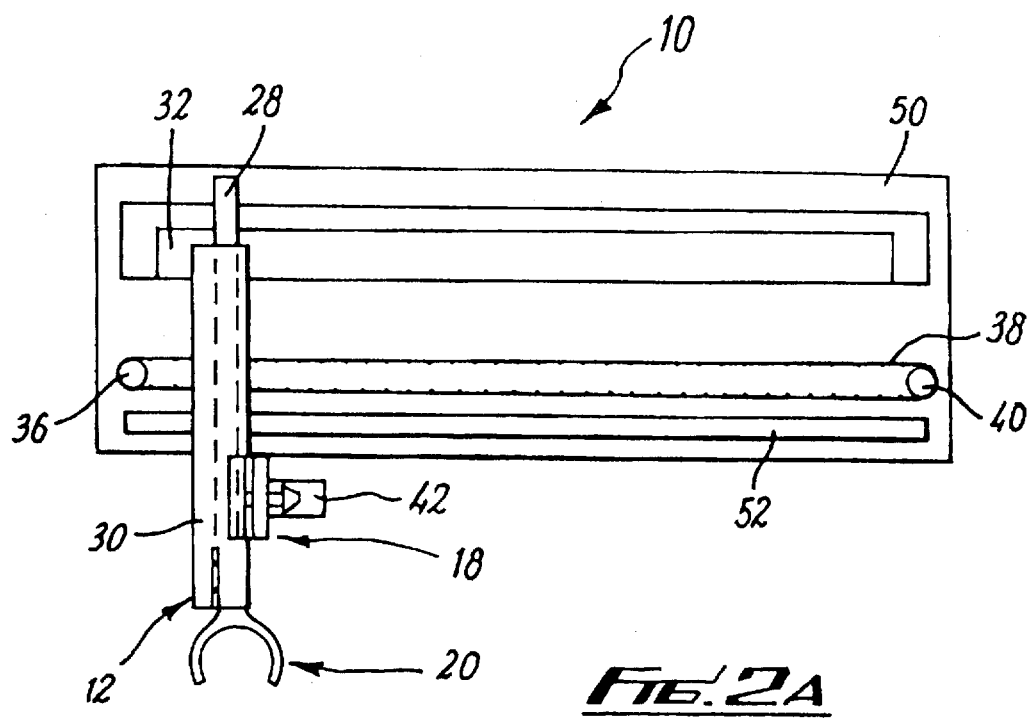

Referring to FIGS. 2A–2E, there is shown the transport apparatus 10 in operation. In FIG. 2A, the transport apparatus 10 is shown in the standby position waiting an operator to use the vending machine.

Figure 2B:
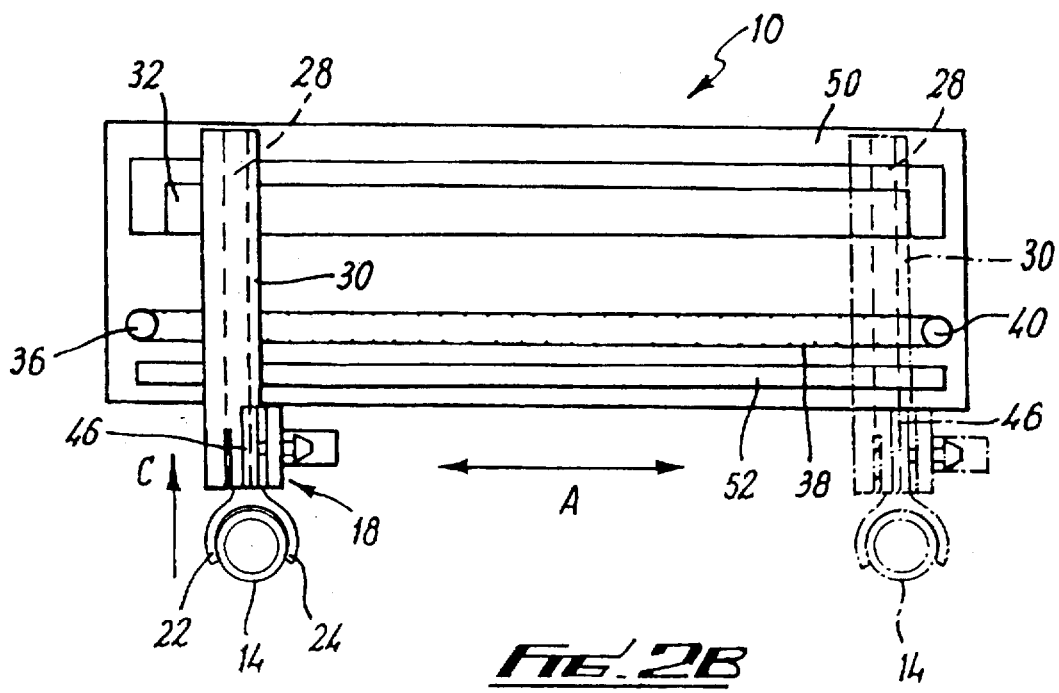

When the machine is operated, a cup 14 drops into the holder 20 between the fingers 22, 24. The drive means 18 then actuates to rotate the gear 46 to move the moveable arm 30 in the direction indicated by the arrow C as shown in FIG. 2B. With the moveable arm 30 in this position, the first drive means 16 can move the holding means 12 linearly in the directions indicated by the arrow A in FIG. 2B so that the cup is arranged below pre-selected dispensers whereby appropriate ingredients can be delivered into the cup. When the cup 14 is dropped into the holder 20 and the moveable arm 30 is moved to the position shown in FIG. 2B, the cup 54 can then be moved to a position under the first selected dispenser to receive the first ingredient, when this ingredient has been dispensed, the cup is then moved to the position under the second selected dispenser to receive the second ingredient, and so on, until all the appropriate ingredients have been delivered to the cup 14.

The first drive means 16 then moves the holding means 12 in the direction indicated by the arrow B in FIG. 2C until the holding means reaches the left hand position as shown in FIG. 2C.

The second drive means 18 then moves the moveable arm 30 in a direction indicated by the arrow E until the moveable arm 30 is in the position shown in FIG. 2C. The first drive means 16 then moves the holding means 12 in the direction indicated by the arrow F until the position shown in FIG. 2D is reached. In this position, the cup 14 can be removed from the holder by the operator.

Figure 2E:
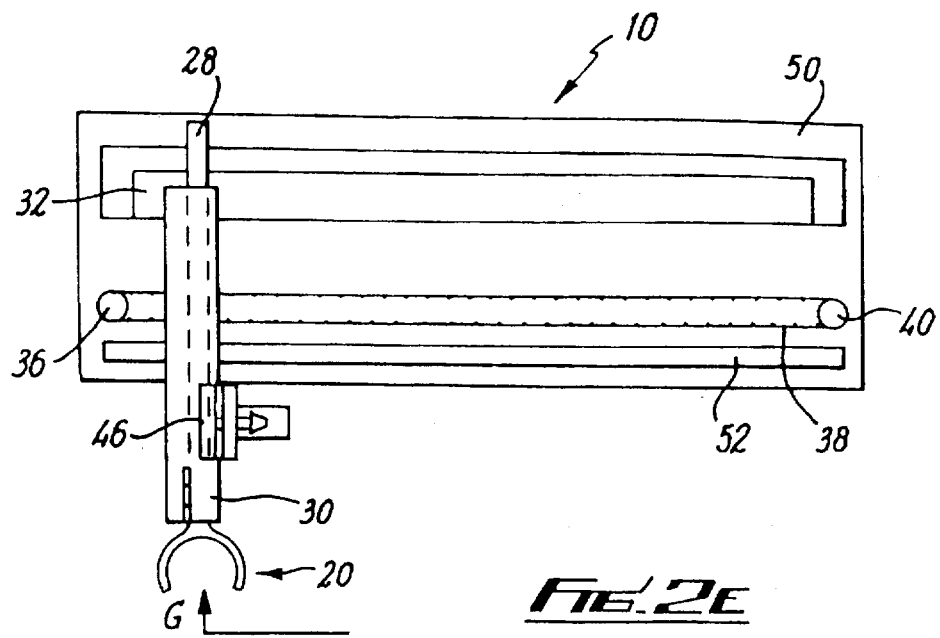

When the cup 14 has been removed, the first and second drive means move the holder 20 in the direction indicated by the arrow G to the position shown in FIG. 2E. This is the same position as that shown in FIG. 2A and the transport apparatus is in the standby position.

Figure 3A:
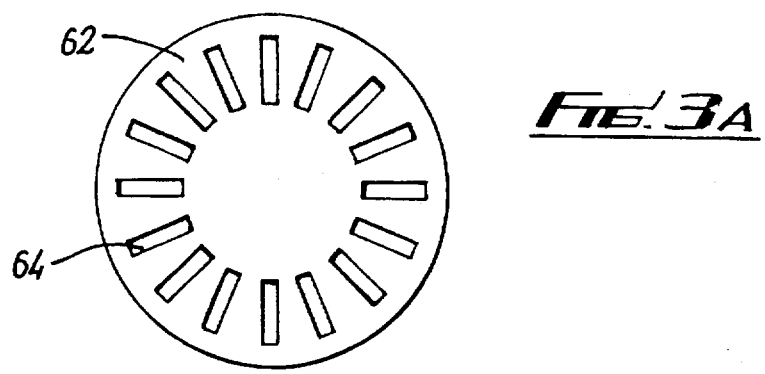
FIG. 3A shows schematically a rotatable member for use in a measuring means in one embodiment.
Figure 3B:
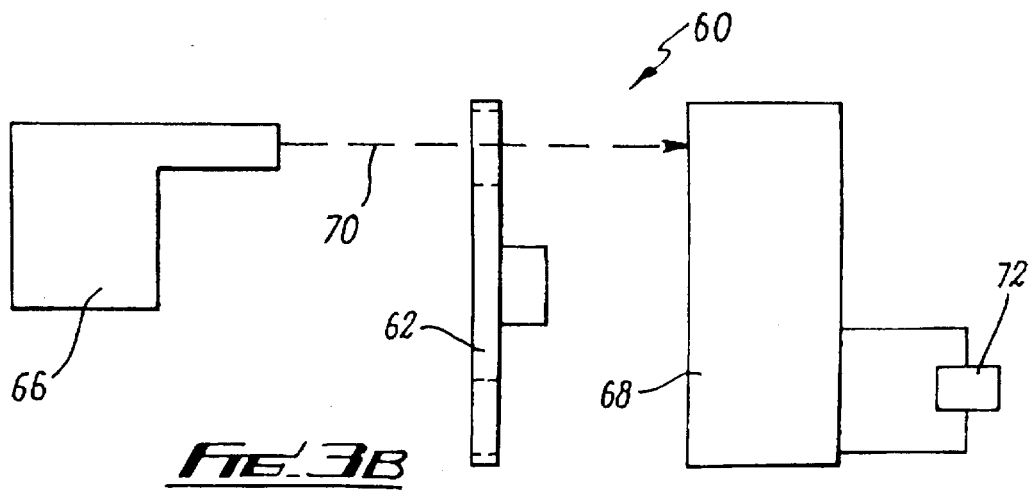
FIG. 3B shows schematically the measuring means referred to above in reference to FIG. 3A.

Referring to FIGS. 3A and 3B, there is shown measuring apparatus 60 which is used by both the first and second drive means 16, 18. The measuring means comprises a rotatable disc 62 defining a plurality of slots 64 extending radially around a peripheral region of the disc 62. Thus, the disc 62 comprises regions, namely the slots 64, through which light can pass, and regions, namely between the slots 64, through which light cannot pass.

Referring to FIG. 3b, the rotary disc 62 is arranged between a light source 66 and a photo-sensitive detector 68. When the first or second drive means 16, 18 is operated, the disc 62 rotates and a light beam 70 is emitted from the light source 66. As the disc 62 rotates, the light beam 70 will pass through each of the slots 64 as they rotate past the light beam 70. Thus, the detector 68 will detect a plurality of pulses of light passing through the slots 64. The rate of rotation of disc 62 is proportional to the distance moved by the holding means 12 or the moveable arm 30. Thus, from counting the number of pulses received by the receiver 68, the distance moved by the holder 20 can be determined. The detector 68 can be connected to suitable control means shown schematically at 72, which in turn is connected to the motors 32, 42 and to the ingredient dispensers. Thus, the control means can move the cup 14 accurately to the various positions as desired.

Figure 4:
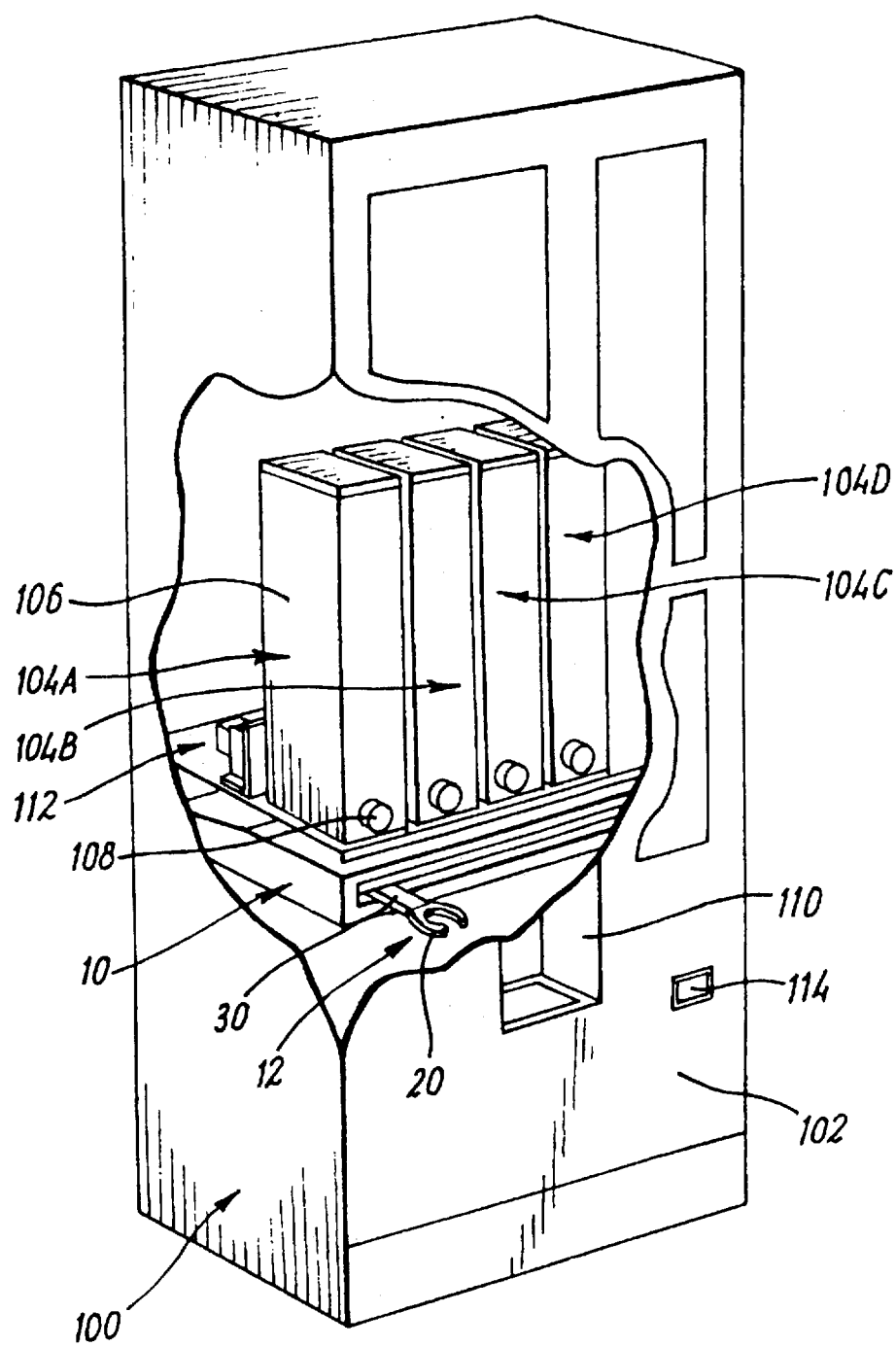
FIG. 4 is a schematic representation of a vending machine incorporating transport apparatus as shown in FIGS. 1 to 3, and having a part cut away to view the insides of the vending machine.

Referring to FIG. 4 there is shown a vending machine 100 having installed therein transport apparatus 10. The transport apparatus 10 shown in FIG. 4 has all the features of the transport apparatus 10 described above, but many of these features are not visible in FIG. 4, being obscured by other features of the vending machine 100. The features of the transport apparatus 10 which are visible are designated with the same reference numerals as those in FIGS. 1 to 3.

The vending machine 100 comprises a cabinet 102 in which the transport apparatus 10 is mounted. The transport apparatus 10 can be fixed to a suitable shelf in the cabinet 102 or any other appropriate support means.

The vending machine 100 also includes a plurality of dispensers 104A to D for dispensing the ingredients for the drinks. Each dispenser 104A to D comprises a vessel 106 and a nozzle (not shown for reasons of clarity) attached to an outlet 108. As described above, the holder 20 is moved to a selected one or more of the dispensers 104A to D so that a cup 14 held in the holder 20 can receive ingredients for the drinks to be vended. For reasons of clarity the cup 14 is not shown in FIG. 4, but reference is made to FIGS. 1 and 2A to 2E.

The vending machine 100 also includes a vend stage area 110 to which the cup 14 is delivered in the holder 20 after the drink has been prepared for the operator to remove the cup from the holder 20.

The vending machine 100 further includes a motor 112 for operating the dispensers 104A to D to dispense appropriate ingredients. The motor 112 is controlled by the control means 72 (not shown in FIG. 4 but see FIG. 3B). It will be appreciated that the control means 72 can be located in any appropriate place in the cabinet 102.

The cabinet 102 further defines a refund slot 114 where tokens or coins not accepted by the vending machine can be refunded.

Various modifications can be made without departing from the scope of the invention, for example, the chain 38 could be in the form of a belt, and the sprocket 46 could be in the form of a wheel moving the moveable arm 30 by friction.

Whilst endeavouring in the foregoing specification to draw attention to those features of the invention believed to be of particular importance it should be understood that the Applicant claims protection in respect of any patentable feature of combination of features hereinbefore referred to and/or shown in the drawings whether or not particular emphasis has been placed thereon.

We claim:

1. Transport apparatus for use in a drinks vending machine, said apparatus comprising:

holding means for receiving and holding a cup;

first drive means connected to the holding means to effect a first linear movement of the holding means, said first linear movement being only in first and second opposite directions;

the holding means comprising an elongate movable arm having a holder for the cup at one end thereof, and a fixed arm fixedly mounted on the first drive means, the movable arm being substantially parallel to the fixed arm and being movably mounted thereon for second linear movement relative thereto from a first retracted position in which the movable arm overlies the fixed arm to a second extended position in which the movable arm is extended from the fixed arm, said second linear movement being only in third and fourth opposite directions, wherein the third and fourth opposite directions are transverse to the first and second opposite directions; and second drive means interposed between and operably connected to the fixed arm and to the movable arm to effect said second linear movement of the movable arm;

wherein the first and second drive means can move said holding means to a dispensing region of the vending machine, the dispensing region comprising a plurality of dispensers from a selected number of which ingredients can be dispensed to the cup, and thereafter the first and second drive means can move said holding means to a delivery position to deliver the cup to an operator.

2. Transport apparatus according to claim 1, wherein the holder comprises first and second fingers extending outwardly from said carrying means to receive a cup therebetween.

3. Transport apparatus according to claim 2, wherein the first and second fingers are curved, and define a major portion of a circle.

4. Transport apparatus according to claim 1, wherein the first and second linear movements are substantially perpendicular to each other.

5. Transport apparatus according to claim 1, wherein the first drive means comprises an endless member, a driven wheel, an idler wheel driven by the endless member, and a first motor to drive the driven wheel.

6. Transport apparatus according to claim 5, wherein the endless member is in the form of a chain or belt extending around the driven and idler wheels.

7. Transport apparatus according to claim 5, wherein the holding means is mounted on said endless member.

8. Transport apparatus according to claim 5, further including a housing on which the driven and idler wheels are mounted, and in which the motor is housed.

9. Transport apparatus according to claim 1, wherein the second drive means comprises a second motor and a gear in engagement with the movable arm.

10. Transport apparatus according to claim 9, wherein the gear is provided with teeth and the moveable arm is provided with corresponding recesses to define a rack with which the teeth on said gear can mesh.

11. Transport apparatus according to claim 1, wherein movement of said moveable arm by said second drive means is in a direction substantially perpendicular to movement of the holding means by said first drive means.

12. Transport apparatus according to claim 1, wherein the moveable arm is slidable relative to the fixed arm.

13. Transport apparatus according to claim 1, wherein the first and second drive means are each provided with measuring means to measure the distance moved by the holder.

14. Transport apparatus according to claim 13, wherein the measuring means comprises a rotatable member defining a plurality of substantially equi-spaced apertures therein.

15. Transport apparatus according to claim 14, wherein the measuring means further includes photo-sensitive counting means on one side of the rotatable member and a light source on the other side to direct light towards the counting means via said apertures, whereby upon movement of the holder by either said first or second drive means, the appropriate rotatable member is caused to rotate and the light source to direct light upon the rotatable member.

16. Transport apparatus according to claim 13 further including control means to control the first and second drive means to process information from the measuring means thereby to control movement of the holder.

17. Transport apparatus according to claim 16, wherein the control means controls the dispensing of ingredients from the dispensers.

18. A vending machine comprising transport apparatus as claimed in claim 1 and a plurality of dispensers each being adapted to hold an ingredient whereby when the cup is moved to the dispensing region, a predetermined amount of ingredient from a selected one or more of the dispensers can be delivered to the cup.

* * * * *